US006807050B1

(12) United States Patent
Whitehorn et al.

(10) Patent No.: US 6,807,050 B1
(45) Date of Patent: Oct. 19, 2004

(54) CONFIGURABLE IMAGE DISPLAY WITH INTEGRAL DOCKING STATION

(75) Inventors: Symon Whitehorn, San Francisco, CA (US); Marcus Schmitt, Hong Kong (HK)

(73) Assignee: Hewlett-Packard Development Company, Houston, TX (US)

( * ) Notice: Subject to any disclaimer, the term of this patent is extended or adjusted under 35 U.S.C. 154(b) by 0 days.

(21) Appl. No.: 10/280,144

(22) Filed: Oct. 25, 2002

(51) Int. Cl.[7] ................................................. G08F 1/16
(52) U.S. Cl. ..................................... 361/681; 361/686
(58) Field of Search ............................... 361/681, 683, 361/686, 679; 710/303, 304

(56) References Cited

U.S. PATENT DOCUMENTS 6,489,932 B1 * 12/2002 Chitturi et al. ............... 345/30

6,522,760 B2 * 2/2003 Azima et al. ................ 381/152

OTHER PUBLICATIONS

Usui et al. (US 2002/0048151 A1), "Connectionenhencement Apparatus and Information Processing Apparatus", Apr. 25, 2002.*
Silvester (US 2003/0112585 A1), "Multiprocessor Notebook Computer with Tablet PC Conversion Capability", Jun. 19, 2003.*

* cited by examiner

*Primary Examiner*—Yean-Hsi Chang
(74) *Attorney, Agent, or Firm*—Lloyd E. Dakin, Jr.

(57) ABSTRACT

An apparatus and method of manufacturing is disclosed for an image display. Disclosed is a display body, having a docking station for accepting a computer; and a display screen coupled to the display body. The method of manufacturing discloses: selecting a display screen; selecting a display body; selecting a docking station; and integrating the screen, body and docking station within a single device.

5 Claims, 7 Drawing Sheets

CONFIGURABLE IMAGE DISPLAY WITH INTEGRAL DOCKING STATION

BACKGROUND OF THE INVENTION

1. Field of the Invention

The present invention relates generally to apparatus and methods for minimally invasive computing, and more particularly to a configurable image display with integral docking station.

2. Discussion of Background Art

For computer users who desire a high degree of portability in their computers, who have a need to make presentations in conference rooms or to various audiences, or need more office space than they have, there aren't many options. In fact, such users typically have only one option, laptop computers.

When such users are at their main office, the laptop is typically ensconced within an expensive space consuming docking station, connected to a display screen which is much larger than that of a laptop's display screen.

Then when such users are called upon to make a presentation, the laptop is typically brought to a conference room and connected to an expensive projector, also taking up space on the conference room table, and which requires a separate projection screen for displaying the projected images to an audience.

Laptop's require such bulky and space consuming support hardware and image projection aids primarily due to efforts to intentionally make only the laptop computer itself as small, light-weight, and portable as possible. Such a focus on just the laptop's dimensions, weight and portability, however, tends to force users and enterprises into in to purchasing a great deal of additional hardware just to support these laptops in order to make them more useable when they are not being carried around. Such a narrow focus also limits the laptop's display screen size and forces a series of trade-offs between price and performance.

What is needed is a device which can offer a highest level of performance at low cost, meet the frequent desktop and presentation needs of a typical user, and still be portable enough so that information can be readily stored and accessed from multiple locations.

In response to the concerns discussed above, what is needed is computing hardware that overcomes the problems of the prior art.

SUMMARY OF THE INVENTION

The present invention is an image display with integral docking station. The present invention, includes a display body, having a docking station for accepting a computer; and a display screen coupled to the display body. Alternate embodiments of the present invention include a flat panel display screen; a wireless signal interface between the computer and image display; computers which are either network, personal, or laptop computers; display screens separated from the display body by a predetermined distance gap for transmitting sound; display screens which themselves transmit sound; and, wire legs for supporting, hanging or carrying the image display.

The method of the present invention includes the elements of: selecting a display screen; selecting a display body; selecting a docking station; and integrating the screen, body and docking station within a single device. Alternate embodiments of the present invention include the elements of: mounting a computer to the docking station; raising the display screen up from the display body by a predetermined distance gap and transmitting sound through the gap; positioning wire frame legs so as to support the image display on a surface; positioning wire frame legs so as to hang the image display on a wall; and positioning wire frame legs so as to carry the image display.

These and other aspects of the invention will be recognized by those skilled in the art upon review of the detailed description, drawings, and claims set forth below.

DETAILED DESCRIPTION OF THE PREFERRED EMBODIMENT

The present invention presents a image display designed to conserve space and provide flexibility. First, to conserve space, the image display is preferably a slim flat-panel display; second, it is supported by very light minimalistic yet strong wire frame folding legs which can also function as a hanger; and third, the display has an integral docking station which can accept a computer riding piggyback behind the display. All these features together creates a space efficient, flexible, and clean design.

Figure 1:
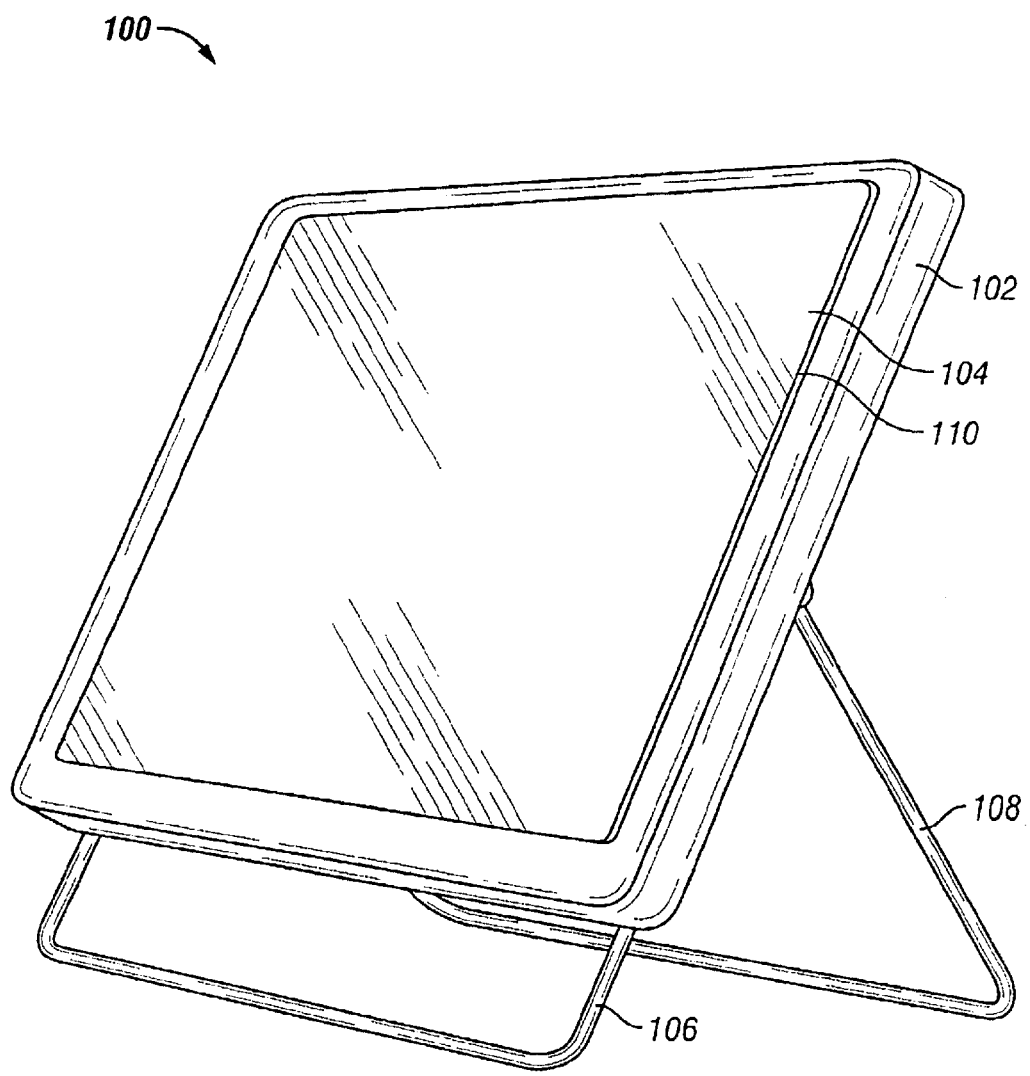
FIG. 1 is a front perspective view of one embodiment of an image display.

FIG. 1 is a front perspective view of one embodiment of an image display 100. The image display 100 includes a display body 102, a display screen 104 coupled to, but raised up from the body 102, a first wire frame leg 106, and a second wire frame leg 108.

By raising the screen 104 up from the body 102, a sound conduit 10 is created. The conduit 110 enhances bass sound reproduction from a distributed mode loudspeaker buried inside the display 100. The distributed mode loudspeaker is a device which uses modal vibration across a surface, such as thin polycarbonate, to generate sound, and eliminates a need for embedded speakers, such as those manufactured by NXT Inc. High-frequency sounds are transmitted by the display screen itself, and low frequencies are transmitted via the conduit. The conduit 108 can be a single continuous opening about the periphery of the display screen, or in alternate embodiments, a series of small sound carrying structures with multiple opening about the periphery of the display screen.

The wire frame legs 106 and 108 are shown supporting the display 100 on a flat surface, however, as will be discussed below, the legs 106 and 108 can be adjusted to a variety of positions for either different display height or angle, and so that the display 100 may be either carried like a briefcase or hung on a wall.

Figure 2:
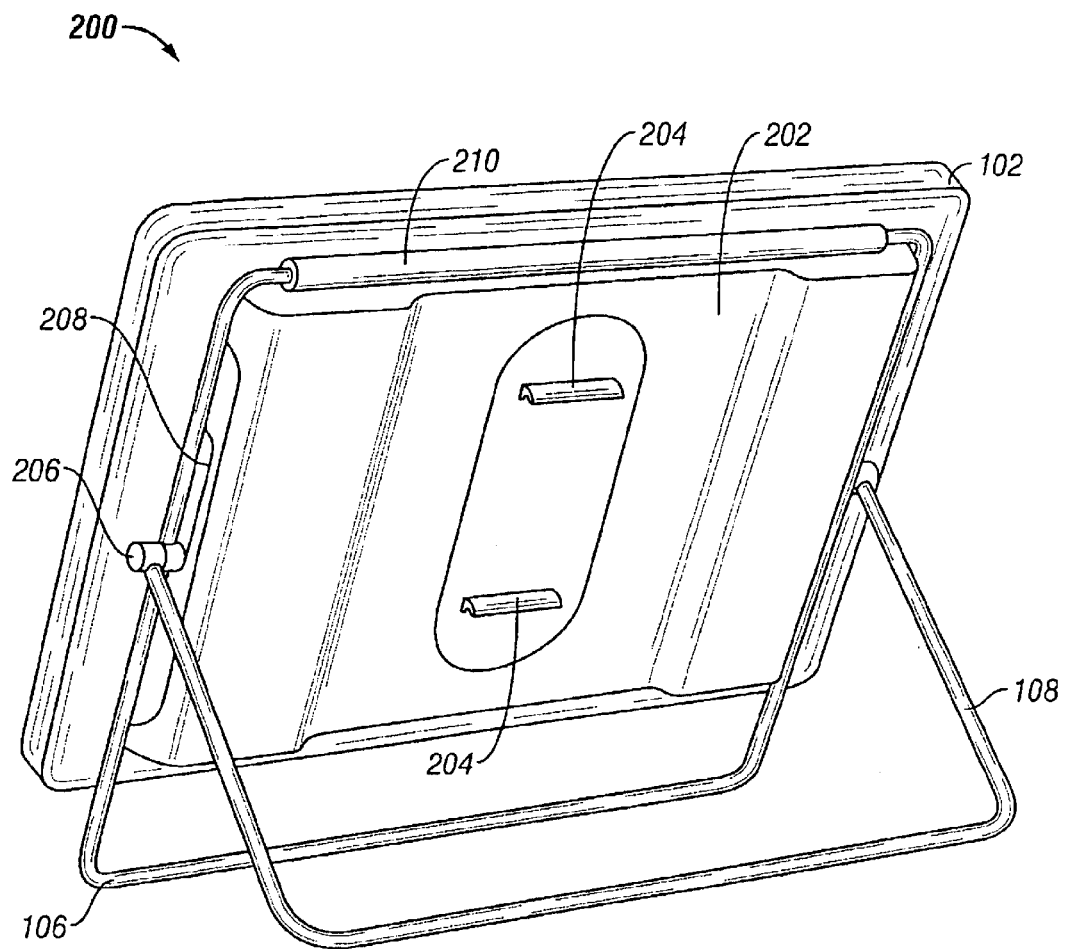
FIG. 2 is a rear perspective view of the image display.

FIG. 2 is a rear perspective view of the image display 100. A docking station 202 is integrated into the body 102 of the display 100. The docking station 202 includes a set of connectors 204 which both support and provide a signal interface for a computer docked (e.g. "piggy-backed") onto the display 100. An adjustable hinge 206 connects the wire frame legs 106 and 108 to the body 102. The hinge 206 permits the second wire frame leg 108 to rotate with respect to the first wire frame leg 106 so that the display 100 can be positioned at various angles with respect to a surface upon which the display 100 sits. The hinge 206 also permits the body 102 of the display 100 to translate, within a notch 208, with respect to the legs 106 and 108 so that the display screen 104 can be positioned at various heights with respect to a surface upon which the display 100 sits. A handle 210 is formed at a top of the first display leg 106. When the first leg 106 is translated with respect to the body 102, the handle 210 allows the display 100 to be either carried by a person or hung on a wall.

Figure 3:
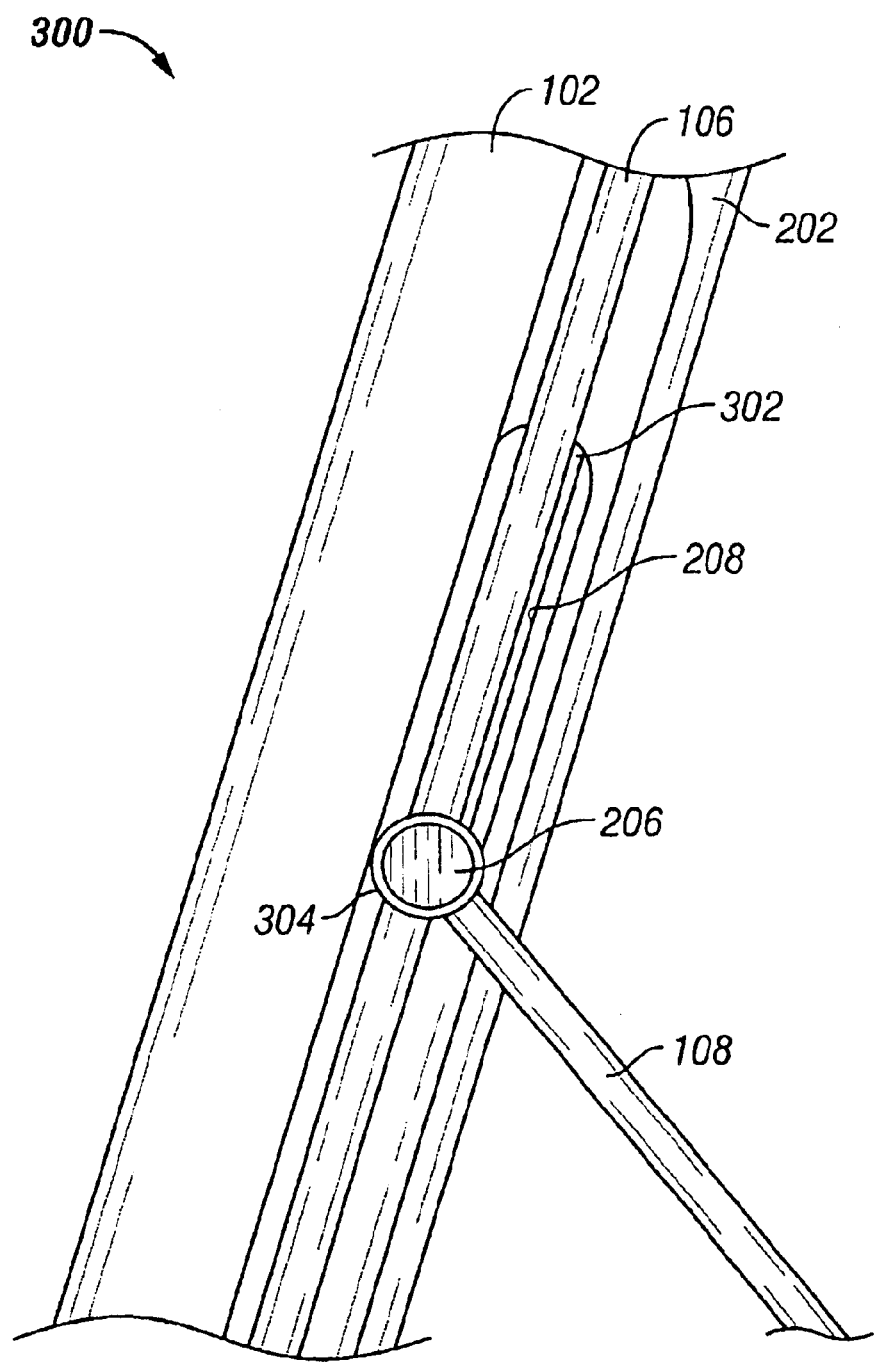
FIG. 3 is a close-up side view of one embodiment of the image display in a tabletop configuration.

FIG. 3 is a close-up side view 300 of one embodiment of the image display 100 in a tabletop configuration. As discussed with respect to FIG. 2, the hinge 206 permits the wire frame legs 106 and 108 to rotate and translate with respect to each other and the body 102 of the display 100, permitting the display 100 to be positioned at various angles with respect to various surfaces and walls. In the embodiment shown, the notch 208 permits the hinge 206 to translate from a top position 302 to a bottom position 304. Such hinge 206 in conjunction with the body 102 of the image display 100 greatly increases the display's 100 ability to be configured in a variety of useful ways.

Figure 4:
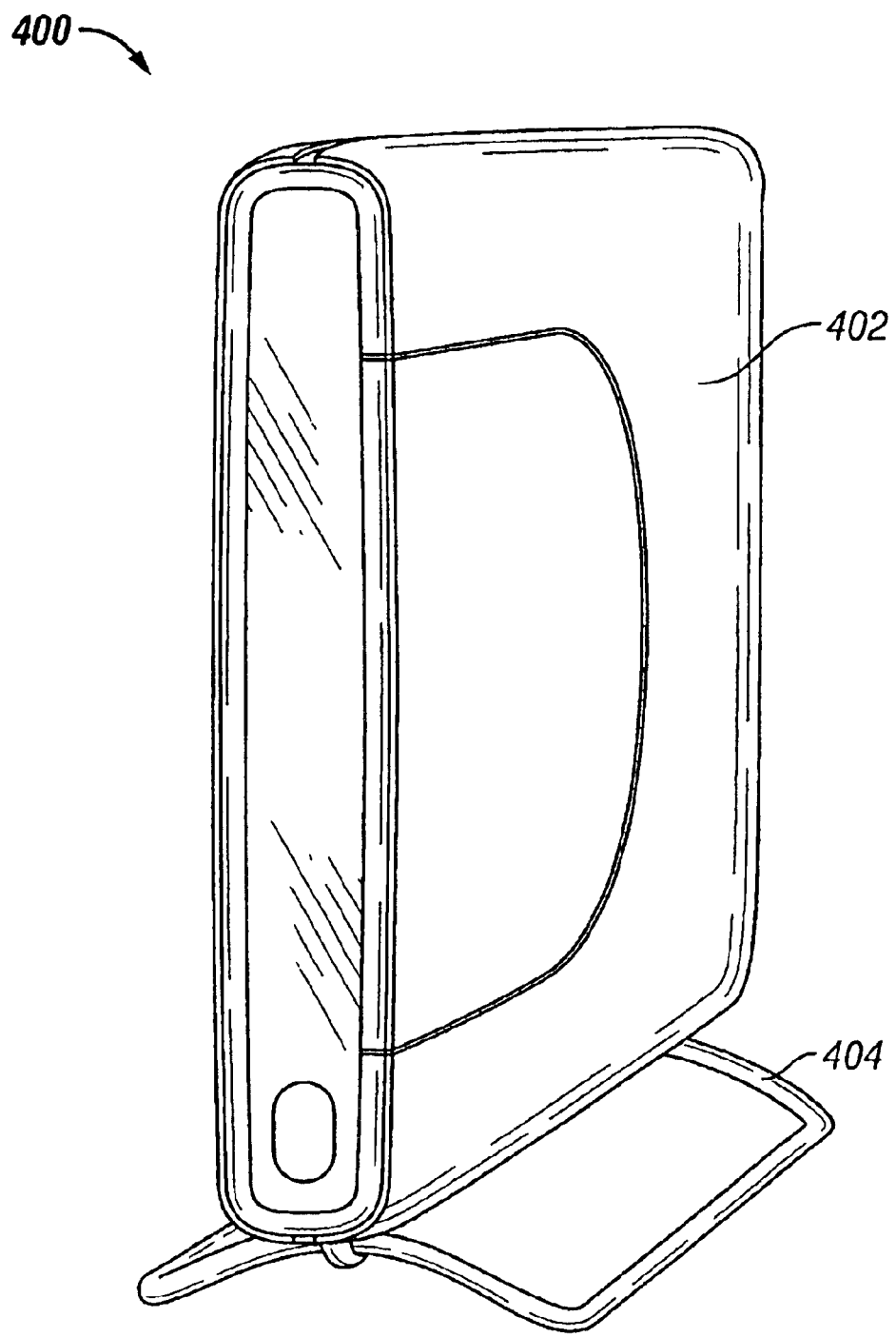
FIG. 4 is a front perspective view of one embodiment of a computer.

FIG. 4 is a front perspective view 300 of one embodiment of a computer 402. The computer 402 is designed to function with the display 100, both of which may either be in communication using physical (e.g. cables, connectors) or wireless technologies. The computer 402 preferably contains a processing unit, memory, a storage device, and various input and output ports. Alternatively, the computer 402 can include a display screen. The computer 402, by itself, can function either as a network computer (w/only a minimal configuration), a standard personal computer (w/full performance configuration), or as a laptop computer (w/a display screen). The computer 402 preferably is designed to be highly portable in all of its configurations, even though in FIG. 4 the computer 402 is shown on a support stand 404.

Figure 5:
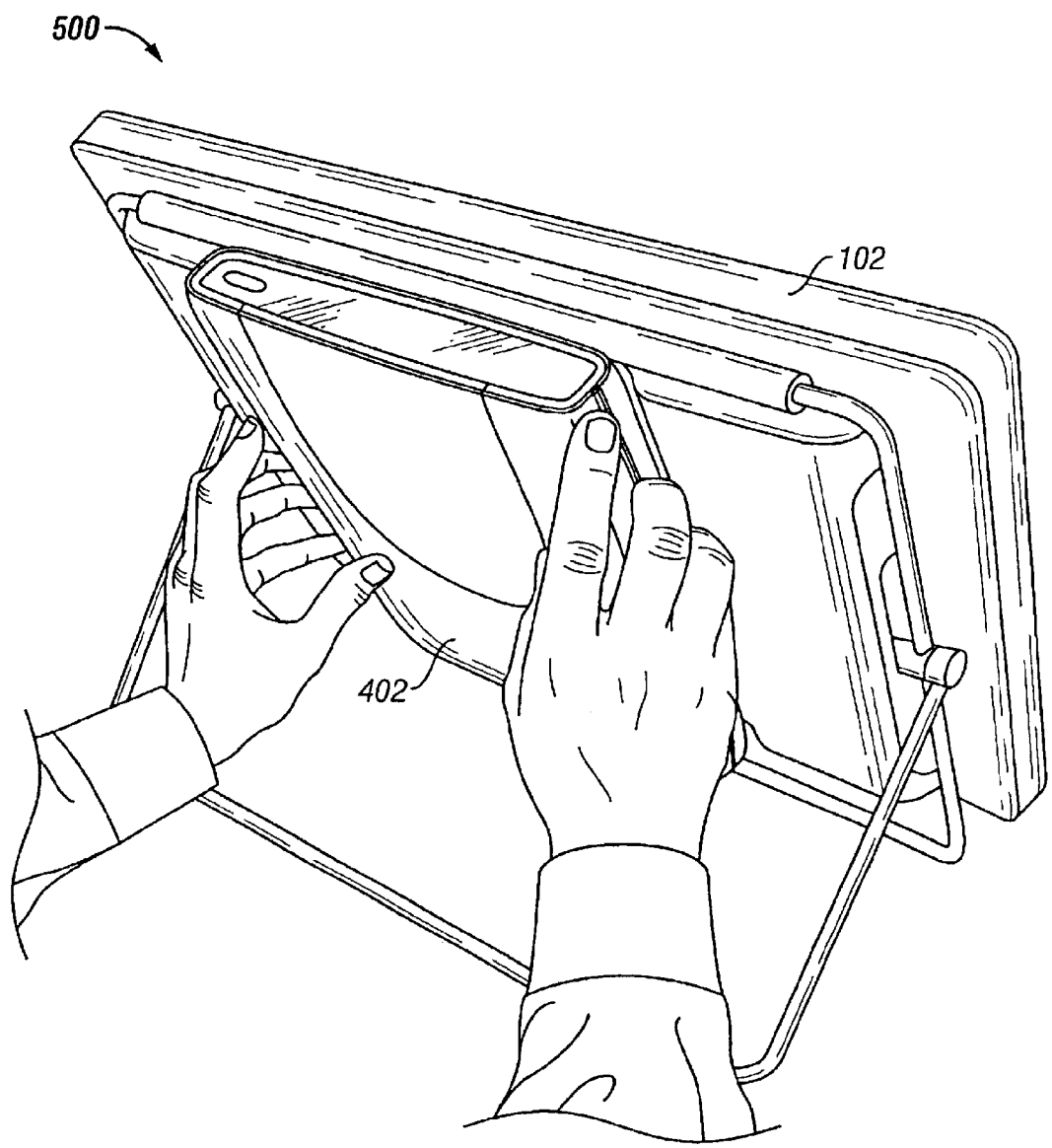
FIG. 5 is a perspective view of the computer being mounted to the image display docking station.

FIG. 5 is a perspective view 500 of the computer 402 being mounted to the image display 100 docking station 202. When the computer 402 is mounted on the image display 100, such combination functions as a full performance computer, having a minimal footprint, and when hung on a wall, saving a considerable amount of desk surface space. Even with the computer 402 docked, the computer's 402 thin profile still permits the combined unit to be easily be hung on a wall or carried by the handle 210. When carried, the combined unit is very similar to that of a laptop computer.

Such a design also affords easy interchangeability between a variety of different computers while still using the same display. Thus it's like having a whole new computer system each time a different computer 402 is docked on the back of the image display 100. The integral docking station also eliminates many of the cables and wires required to hook current docking stations to current computer displays, as well as the cable and wires required to hook up laptop computers to conference room projection equipment.

Using the present invention, enterprises can reserve expenditure of significant resources in very large display 100 for only a few common areas such as conference rooms and theaters. This obviates a need for expensive projection and projection screen equipment in such areas. Less expensive smaller image displays 100 can be used for individual employee offices, obviating a need for expensive docking stations. The computer 402 can be easily carried between one's office and a conference room and easily mounted to either image display 100 as necessary.

The present invention also provides a way to upgrade the computer 402 while avoiding a need to replace an otherwise separate and expensive flat panel display. This could be a quite popular use, since flat panel display technology tends not to advance as quickly as processor, memory and storage technologies.

Figure 6:
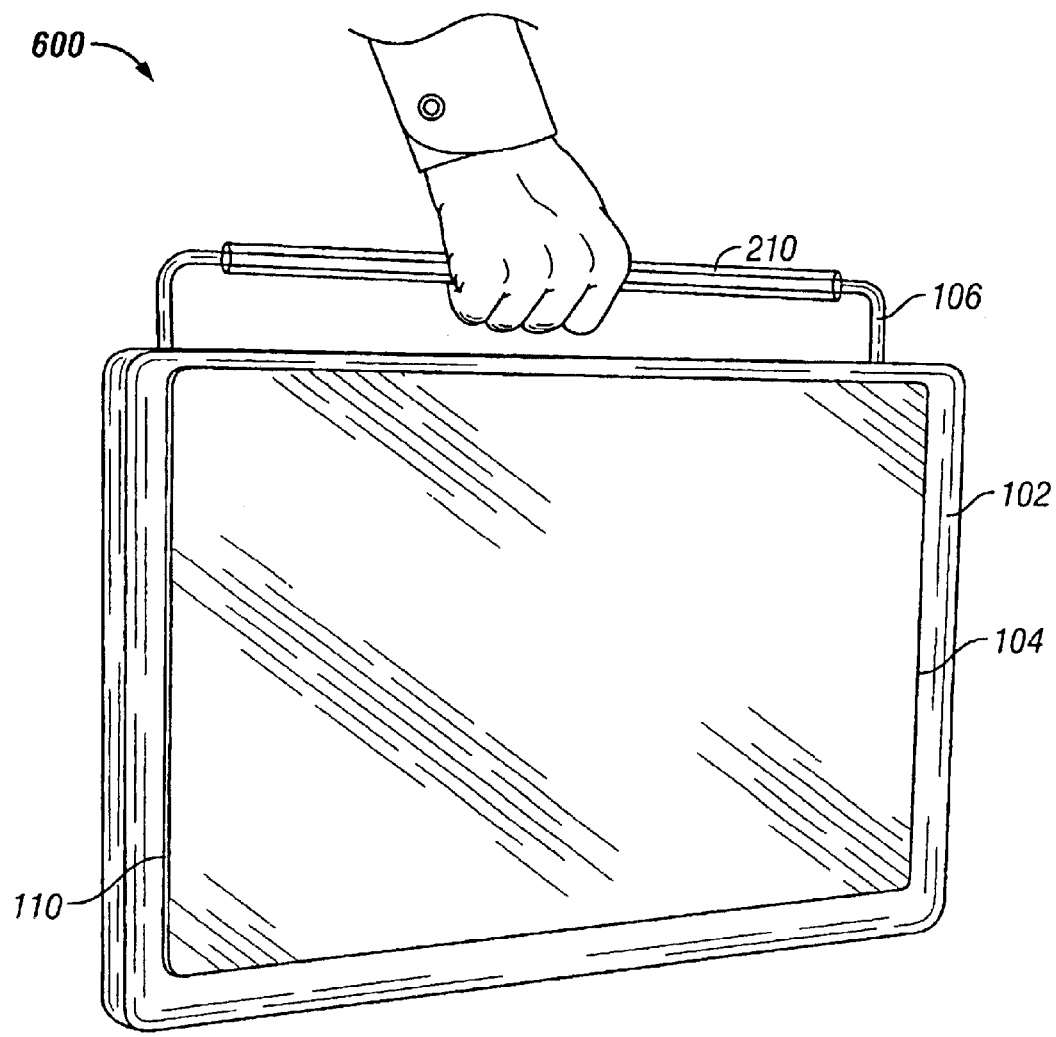
FIG. 6 is a front perspective view of the image display in a hanging configuration.

FIG. 6 is a front perspective view 600 of the image display in a hanging configuration. A user grasps the handle 210, carrying the display 100 as well as the computer 402, if docked. In this way the present invention functions as a portable computer, which may be covered with a carrying case of some sort for further protection. Alternatively, as discussed, the handle 210 permits the display 100 and computer 402 to be hung on a conference room or cubical wall, providing enhanced visibility and/or conserving desk space.

Figure 7:
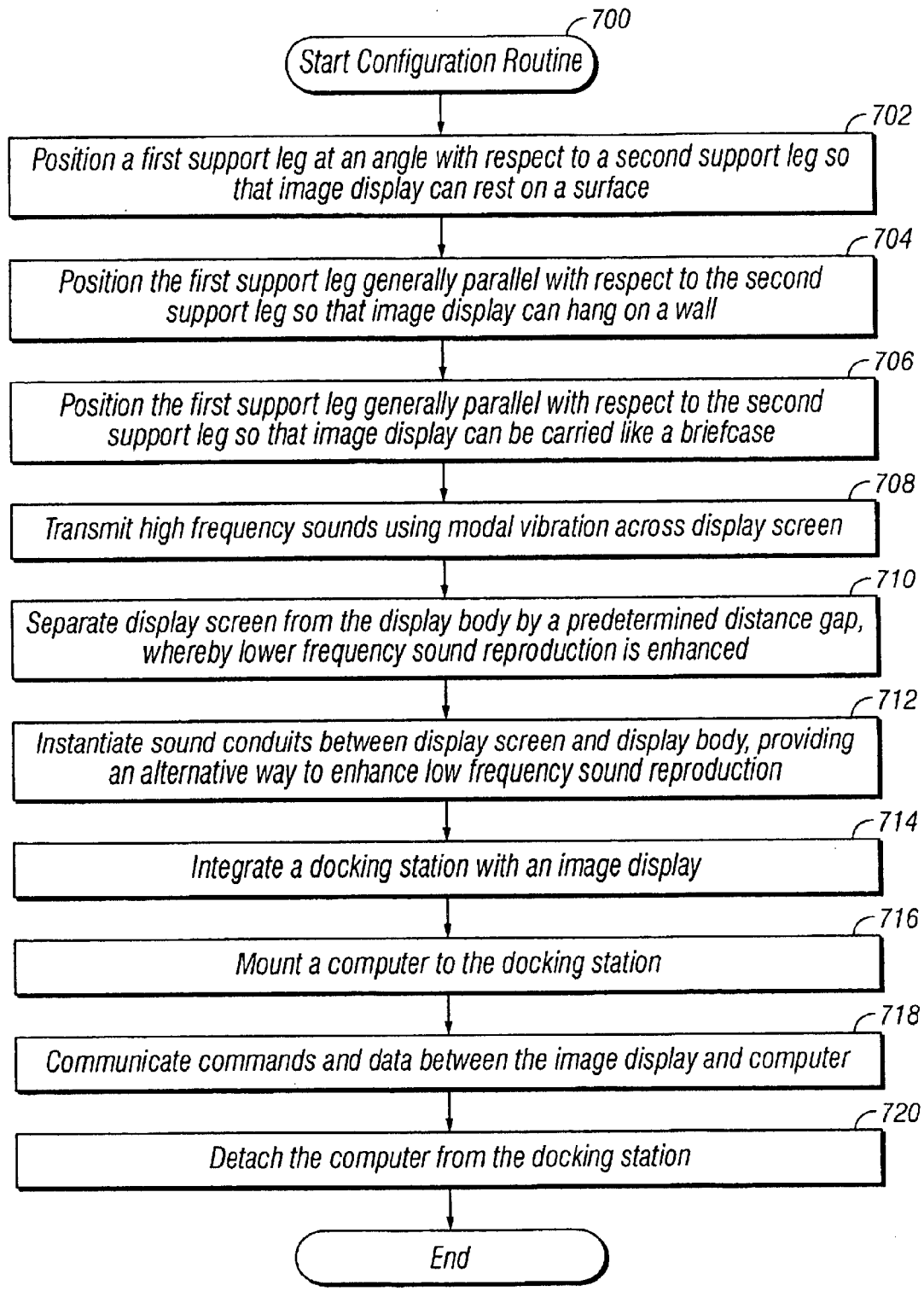
FIG. 7 is a flowchart of one embodiment of a method for configuring the image display.

FIG. 7 is a flowchart of one embodiment of a method 700 for configuring the image display. In step 702, the first support leg 106 is positioned at an angle with respect to the second support leg 108 so that image display 100 can rest on a surface. Next, in step 704, the first support leg 106 is positioned generally parallel with respect to the second support leg 108 so that image display 100 can hang on a wall. In step 706, the first support leg 106 is positioned generally parallel with respect to the second support leg 108 so that image display 100 can be carried like a briefcase.

In step 708, high frequency sounds are transmitted using modal vibration across the display screen 104. In step 710, the display screen 104 is separated from the display body 102 by a predetermined distance gap, whereby lower frequency sound reproduction is enhanced. In step 712, sound conduits arc instantiated between the display screen 102 and the body 102, providing an alternative way to enhance low frequency sound reproduction.

In step 714, the docking station 202 is integrated with an image display. Then in step 716, the computer 402 is mounted to the docking station 202. In step 718, commands and data are exchanged between the image display 100 and the computer 402 using either a physical or wireless communications link. Finally, in step 720, the computer 402 is detached from the docking station 202.

While one or more embodiments of the present invention have been described, those skilled in the art will recognize that various modifications may be made. Variations upon and modifications to these embodiments are provided by the present invention, which is limited only by the following claims.

What is claimed is:

1. An image display, comprising:

a display body, having a docking station for accepting a computer;

a flat panel display screen coupled to the display body, and separated from the display body by a predetermined distance gap;

a distributed mode loudspeaker coupled to transmit sound through the gap;

a first wire frame leg coupled to the display body, and a second wire frame leg coupled to the first leg and having a first position with respect to the first leg for supporting the display on a surface, a second position with respect to the first leg for hanging the display, and a third position with respect to the first leg for carrying the display.

2. An image display, comprising:

a display body, having a docking station for accepting a computer;

a display screen coupled to the display body;

wherein the display screen is a flat panel display;

a first wire frame leg coupled to the display body; and a second wire frame leg coupled to the first leg and having a first position with respect to the first leg for supporting the display on a surface, a second position with respect to the first leg for hanging the display and a third position with respect to the first leg for carrying the display.

3. The image display of claim 2, further comprising:

a notch coupled to the display body; and an adjustable hinge coupling the wire frame legs to the display body, and permitting the hinge to translate with respect to the display body.

4. An image display comprising:

a display body, having a docking station for accepting a computer;

a display screen coupled to the display body;

wherein the display screen is a flat panel display;

a first wire frame leg coupled to the display body; and a second wire frame leg coupled to the first leg and having a first position with respect to the first leg for supporting the display on a surface, and a second position with respect to the first leg for hanging the display.

5. An image display comprising:

a display body, having a docking station for accepting a computer;

a display screen coupled to the display body;

wherein the display screen is a flat panel display;

a first wire frame leg coupled to the display body; and a second wire frame leg coupled to the first leg and having a first position with respect to the first leg for supporting the display on a surface, and a second position with respect to the first leg for carrying the display.

* * * * *